US012116538B2

(12) United States Patent
Greager et al.

(10) Patent No.: US 12,116,538 B2
(45) Date of Patent: Oct. 15, 2024

(54) PROCESS

(71) Applicant: Velocys Technologies Ltd, Oxford (GB)

(72) Inventors: Ivan Philip Greager, Houston, TX (US); Roger Allen Harris, Houston, TX (US); Neil Alexander King, Oxford (GB); Soumitra R. Deshmukh, Houston, TX (US); Zheyan Qiu, Sugar Land, TX (US)

(73) Assignee: Velocys Technologies Ltd., Oxford (GB)

( * ) Notice: Subject to any disclaimer, the term of this patent is extended or adjusted under 35 U.S.C. 154(b) by 0 days.

(21) Appl. No.: 17/318,328

(22) Filed: May 12, 2021

(65) Prior Publication Data

US 2021/0355392 A1 Nov. 18, 2021

(30) Foreign Application Priority Data

May 28, 2020 (GB) ...................................... 2007980

(51) Int. Cl.
*C10J 3/86* (2006.01)
*C01B 3/36* (2006.01)
(Continued)

(52) U.S. Cl.
CPC .................... *C10J 3/86* (2013.01); *C01B 3/36* (2013.01); *C01B 3/48* (2013.01); *C10J 3/463* (2013.01);
(Continued)

(58) Field of Classification Search
CPC ...... C10J 3/86; C10J 3/463; C10J 2300/0909; C10J 2300/0916; C10J 2300/0946;
(Continued)

(56) References Cited

U.S. PATENT DOCUMENTS 3,873,845 A * 3/1975 Osthaus ................ F01K 23/067
60/39.12
4,110,359 A 8/1978 Marion
(Continued)

FOREIGN PATENT DOCUMENTS

CA 2623824 A1 * 2/2007 ................ C10J 3/00
EP 2350233 B1 8/2011
(Continued)

OTHER PUBLICATIONS

Machine Translation of WO 2021/1180483A1 (Dec. 1, 2022) (Year: 2022).*

(Continued)

*Primary Examiner* — Matthew J Merkling
(74) *Attorney, Agent, or Firm* — Renner, Otto, Boisselle & Sklar, LLP

(57) ABSTRACT

A process for the manufacture of one or more useful products comprises: gasifying a carbonaceous feedstock comprising waste materials and/or biomass in a gasification zone to generate a raw synthesis gas; supplying at least a portion of the raw synthesis gas to a clean-up zone to remove contaminants and provide a clean synthesis gas; supplying the clean synthesis gas to a first further reaction train to generate at least one first useful product and a tailgas; and diverting selectively on demand a portion of at least one of the carbonaceous feedstock, the clean synthesis gas, the tailgas and the light gas fraction to heat or power generation within the process, in response to external factors to control the carbon intensity of the overall process and enable GHG emission savings.

25 Claims, 1 Drawing Sheet

(51) Int. Cl.
*C01B 3/48* (2006.01)
*C10J 3/46* (2006.01)
*C10J 3/60* (2006.01)
*C10J 3/72* (2006.01)
*C10J 3/82* (2006.01)

(52) U.S. Cl.
CPC ............ *C10J 3/60* (2013.01); *C10J 3/721* (2013.01); *C10J 3/723* (2013.01); *C10J 3/82* (2013.01); *C10J 2300/0909* (2013.01); *C10J 2300/0916* (2013.01); *C10J 2300/0946* (2013.01); *C10J 2300/1215* (2013.01); *C10J 2300/1606* (2013.01); *C10J 2300/1612* (2013.01); *C10J 2300/1643* (2013.01); *C10J 2300/1659* (2013.01); *C10J 2300/1687* (2013.01); *C10J 2300/1807* (2013.01); *C10J 2300/1846* (2013.01); *C10J 2300/1853* (2013.01)

(58) Field of Classification Search
CPC ........ C10J 2300/1606; C10J 2300/1612; C10J 2300/1643; C10J 2300/1659; C10J 2300/1687; C10J 2300/1807; C10J 2300/1846; C10J 2300/1853
See application file for complete search history.

(56) References Cited

U.S. PATENT DOCUMENTS

| 2005/0150820 | A1* | 7/2005 | Guo | C10G 2/32 208/950 |
|---|---|---|---|---|
| 2006/0101715 | A1* | 5/2006 | Vlok | C10J 3/42 48/210 |
| 2009/0012188 | A1 | 1/2009 | Rojey et al. | |
| 2009/0152209 | A1* | 6/2009 | Agrawal | C02F 1/20 210/758 |
| 2011/0000366 | A1* | 1/2011 | Koss | C10J 3/82 95/42 |
| 2013/0137783 | A1 | 5/2013 | Kumar et al. | |
| 2013/0331620 | A1* | 12/2013 | Abhari | C10G 3/50 568/895 |
| 2014/0223824 | A1* | 8/2014 | Do | F23G 5/033 48/209 |
| 2014/0224706 | A1 | 8/2014 | Do et al. | |
| 2015/0073188 | A1* | 3/2015 | Floudas | C10L 1/06 422/187 |
| 2015/0299589 | A1 | 10/2015 | Bryan et al. | |
| 2019/0118157 | A1 | 4/2019 | Chandran et al. | |
| 2019/0211269 | A1* | 7/2019 | Galloway | C10K 3/006 |

FOREIGN PATENT DOCUMENTS

| JP | 2009298974 A * | 12/2009 | ............ B01J 12/00 |
|---|---|---|---|
| WO | 2008010994 A2 | 1/2008 | |
| WO | 2008017741 A1 | 2/2008 | |
| WO | WO-2009046522 A1 * | 4/2009 | ............ C10J 3/20 |
| WO | 2013009419 A1 | 1/2013 | |
| WO | 2015042315 A1 | 3/2015 | |
| WO | 2016178915 A1 | 11/2016 | |
| WO | 2017011025 A1 | 1/2017 | |
| WO | 2017039741 A1 | 3/2017 | |
| WO | 2018026388 A1 | 2/2018 | |
| WO | WO-2021180483 A1 * | 9/2021 | |

OTHER PUBLICATIONS

International Search Report for related International Application No. PCT/EP2021/062347 mailed Aug. 18, 2021.
Combined Search and Examination Report for related Great Britain Application No. GB2007980.2 dated Aug. 14, 2020.

* cited by examiner

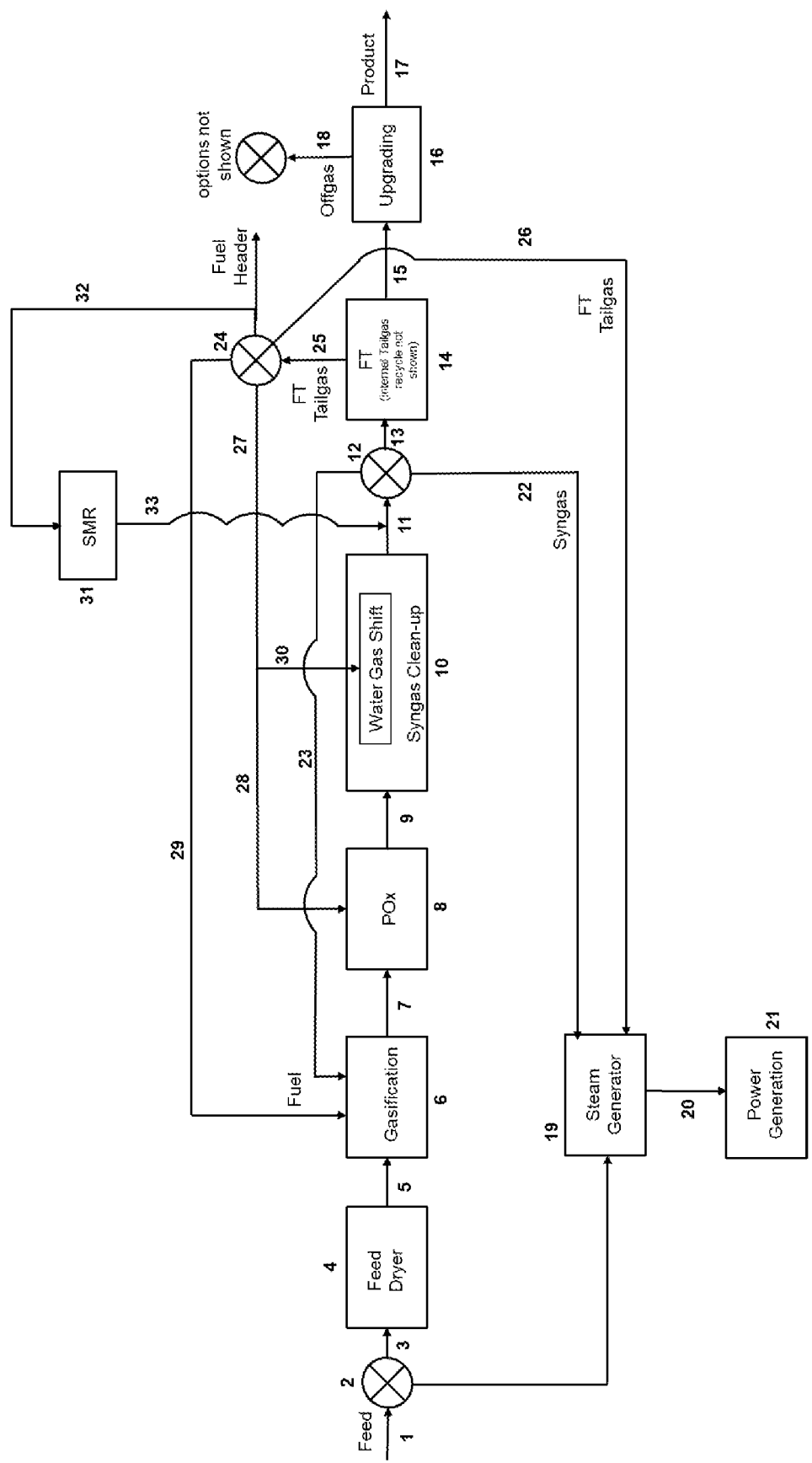

PROCESS

This application claims the benefit of U.S. Provisional Patent Application No. 63/024,462, filed May 13, 2020, and claims priority to UK Patent Application No. GB 2007980.2, filed May 28, 2020, the disclosures of which are incorporated herein by reference in their entireties.

TECHNICAL FIELD

The present invention concerns a chemical engineering process for the production of useful products, for example synthetic fuels, from waste materials and/or biomass in a manner which allows for increased control of carbon intensity of the process in comparison with conventional processes of the type.

BACKGROUND

It is widely known in the art to manufacture useful products such as synthetic fuels from waste materials and/or biomass. We may refer to such manufacturing methods as WTL (Waste-to-Liquids) and BTL (Biomass-to-Liquids) processes.

Typical WTL and BTL processes involve the gasification by steam reforming of waste or biomass feedstock to produce a raw synthesis gas which may then be treated and purified in various ways before entering a chemical reaction train to generate a useful product.

In the case of the useful product being a synthetic fuel (for example a drop-in synthetic fuel), the chemical reaction train will typically comprise a Fischer-Tropsch (FT) reactor. The FT process is widely used to generate fuels from carbon monoxide and hydrogen and can be represented by the equation:

$$(2n+1)H_2 + nCO \longrightarrow C_nH_{2n+2} + nH_2O$$

Carbon intensity (also known as CI) is a measure of the amount of carbon used by or released from an industrial process relative to the tangible results of that process, often expressed as grams of $CO_2$ equivalent emitted per megajoule of energy produced by the process (or producible from the products of the process).

The term "Carbon Intensity" or "CI" may also be construed in accordance with a model based on an overall lifecycle assessment, for example forest to tailpipe. For example, GREET a publicly available spreadsheet model developed at Argonne National Laboratory (ANL) or a California-specific version of Argonne National Laboratory's GREET life cycle model used to calculate GHG emissions under the California Low Carbon Fuel Standard (LCFS) is the CA-GREET Version 3.0 (Tier 1) model. Other appropriate models are available such as the Biomethane & Biogas Carbon Calculator published by NNFCC Ltd, Biocentre, York Science Park, Innovation Way, York, YO10 5NY UK. Carbon intensity provides a measure of the overall energy efficiency of a process. Carbon intensity may be understood for example in terms of grams of $CO_2$ equivalent to per MJ of fuel produced.

It would be desirable to allow greater control of carbon intensity in a chemical engineering process for the production of useful products, for example synthetic fuels, from waste materials and/or biomass, in order to afford a more environmentally beneficial process, in particular one which may be flexibly responsive to other factors, such as the availability of clean power for example. The current environmental standards target in the US is that for an advanced biofuel produced in a WTL or BTL process to qualify for RINs (renewable identification number), a 60% or greater reduction in greenhouse gas emissions (measured as gCO2-eq/MJ of fuel) is achieved compared to the baseline for a fuel derived from a refinery. Similarly, the Renewable Transport Fuel Obligation Guidance issued by the UK government (Article 17(2)) mandates GHG emissions savings of at least 60%. Operationally it may be desirable to reduce the greenhouse gas emissions of any given synthetic fuel production pathway by at least 65%.

The problem of controlling, or at least reducing, carbon intensity in fuel production has been addressed to some extent in the art.

For example WO2015042315 discloses a method for reducing the carbon emissions intensity of a fuel which involves capturing a carbon dioxide fluid from a first hydrocarbon fluid production process; and injecting the captured carbon dioxide into a subterranean zone from one or more wellbores which is said to enhance the production of a second hydrocarbon fluid from the zone, at least one of the first or the second hydrocarbon fluids being said to be processable into a hydrocarbon fuel that includes a low carbon intensity fuel based, at least in part, on the captured and injected $CO_2$ fluid.

WO2013009419 discloses a low sulphur bunker fuels composition derived from blending various bio-oils with petroleum based heavy residual fuel oils and distillates where the final sulfur content and carbon intensity is controlled by the ratio of bio-oil to other heavy residual fuel oils and distillates.

To date, there appears to have been little consideration given as to how carbon intensity may be controlled in an otherwise satisfactory WTL or BTL process, and no consideration given to the desirability of controlling plant configuration to be responsive to other factors which may affect carbon intensity.

WTL and BTL processes are very well known in the art.

For example, EP2350233A1 relates to a method for producing liquid hydro carbonaceous product from solid biomass, the method comprising gasifying solid biomass to produce raw synthesis gas, conditioning the raw synthesis gas to obtain purified synthesis gas and subjecting the purified gas to a Fischer-Tropsch synthesis.

WO2018026388 describes converting one or more carbon-containing feedstocks, for example plastics, agriculture residues, and forest remediation wood into hydrocarbons.

Some prior art WTL and BTL processes have sought to address environmental concerns.

For example, WO2017011025A1 and WO2017039741A1 disclose systems for producing high biogenic carbon concentration Fischer-Tropsch (F-T) liquids derived from municipal solid wastes (MSW), and a high biogenic content fuel derived from renewable organic feedstock sources.

Other prior art documents have considered ways of recovering carbon dioxide in production processes. For example, WO2016178915 discloses processes involving formation of hydrocarbons and oxygenated hydrocarbons through use of oxygen supplied by ion transport membranes. This document relates in part to a process involving steam reforming and subsequent production of a synthetic product where carbon dioxide and/or hydrogen downstream of the process is reclaimed to generate the synthetic product.

US20110000366A1 describes a process for the treatment of a $CO_2$-containing stream of process gas, which is obtained in the production of pure synthesis gas from raw gas in the partial oxidation of heavy oils, petroleum coke or wastes, or in the gasification of coal, or when processing natural gas or accompanying natural gas, $CO_2$ is removed physisorptively or chemisorptively, and the solvent loaded with $CO_2$ is expanded to a lower pressure for the desorption of $CO_2$. In order to generate $CO_2$ as pure as possible, the contaminated $CO_2$ is condensed to at least 60 bar[a] or below its critical temperature to at least 70 bar[a], and the impurities contained in the liquid $CO_2$ are removed by stripping with gaseous $CO_2$ guided in counterflow.

Other prior art disclosures include US2019118157A1, WO2008010994A2, U.S. Pat. No. 4,110,359A, US2009012188A1, WO2008017741A1 and US2015299589A1

It would appear that none of these documents provides a satisfactory means for controlling carbon intensity in an otherwise functional WTL or BTL process.

The object of the present invention is to provide an improved process for manufacturing a useful product such as synthetic fuel from waste materials and/or biomass, in which the carbon intensity of the process is controllable in comparison with conventional such processes.

SUMMARY OF INVENTION

In a first aspect of the present invention there is provided a process for the manufacture of one or more useful products comprising:

a. gasifying a carbonaceous feedstock comprising waste materials and/or biomass in a gasification zone to generate a raw synthesis gas;

b. optionally partially oxidising the raw synthesis gas in a partial oxidation zone to generate partially oxidised raw synthesis gas;

c. supplying at least a portion of the, optionally partially oxidised, raw synthesis gas to a clean-up zone to remove contaminants and provide a clean synthesis gas;

d. optionally shifting the hydrogen to carbon monoxide ratio of the clean synthesis gas in a hydrogen to carbon monoxide ratio shifting zone to generate shifted clean synthesis gas;

e. supplying the, optionally shifted, clean synthesis gas to a first further reaction train to generate at least one first useful product and a tailgas;

f. optionally upgrading the first useful product in a second further reaction train to generate a second useful product and a light gas fraction; and g. diverting selectively on demand a portion of at least one of the carbonaceous feedstock, the clean synthesis gas, the tailgas and the light gas fraction to heat or power generation within the process.

Means within the process may provide selectively on demand the means to divert one or more of:

i. a portion of the carbonaceous feedstock to a combustor to generate energy for the production of steam for use on plant or for power generation; and/or ii. a portion of the clean synthesis gas as fuel gas for use on plant (e.g. for fuelling the gasification zone) and/or for the generation of steam for use on plant and/or for power generation; and/or iii. at least a portion of the tailgas to:
the first further reaction train (as internal recycle); and/or
the partial oxidation zone, when present; and/or
the hydrogen to carbon monoxide shifting zone, when present; and/or
a fuel gas stream for fuelling the gasification zone; and/or
a steam methane reforming zone (not only as process gas but also potentially as a fuel) to generate a reformed tailgas having a higher hydrogen to carbon monoxide ratio than the tailgas and supplying the reformed tailgas as a feed to the first further reaction train; and/or
a fuel gas header for use on plant and/or for the generation of steam for use on plant or for power generation; and/or iv. at least a portion of the light gas fraction to:
the partial oxidation zone, when present; and/or
a fuel gas stream for fuelling the gasification zone; and/or
a third useful product stream; and/or
a fuel gas header for use on plant and/or for the generation of steam for use on plant or for power generation.

Preferably means are provided to divert, selectively on demand, portions of at least two, optionally at least three or optionally at least four, of the carbonaceous feedstock, clean synthesis gas, tailgas and light gas fraction from the main process stream as described above.

The process of the invention is therefore configurable to control the carbon intensity of the process responsive to other (often external) factors. For example, if the facility benefits from the ready availability of clean, green power (such as may be generated by a wind turbine on a windy day for example) then it may be desirable to maximise product make on plant, since the power required to make that product is already green. However, in the suggested exemplary scenario, when the wind drops and the turbine generates inadequate power for the facility, necessitating the import of "dirty" power from the grid then it may be desirable to minimise the import of that "dirty" power by diverting a portion of material in the process from product make to energy production. In other words, the configurability of the plant is such as to make it capable of controlling (ideally minimising) carbon intensity responsive to (for example) external factors.

The raw synthesis gas generated in step a. may for example comprise $H_2$, CO, $CO_2$, at least one other carbonaceous material comprising at least $CH_4$ and tars, and contaminants comprising particulates, ammonia or HCl, and sulphurous gas; and optionally containing inert gas such as $N_2$. It is to be understood that carbonaceous material, for example, $CH_4$ and inert gas such as $N_2$ present in the raw synthesis gas generated in this step is expected to be carried forth through each of the subsequent steps and may not be explicitly mentioned.

The clean-up zone in step c. may optionally comprise a primary clean-up zone supplied with an aqueous stream at least partially to wash particulates and ammonia or HCl out of raw synthesis gas, the aqueous stream being selected to be a neutral or acidic aqueous stream when ammonia is a contaminant in the raw synthesis gas and being selected to comprise a basic aqueous stream when HCl is a contaminant in the raw synthesis gas, to provide an aqueous-washed raw synthesis gas comprising $H_2$, CO, $CO_2$ and contaminants comprising sulphurous gas.

The clean-up zone c. may optionally further comprise supplying at least a portion of the aqueous-washed raw synthesis gas to a secondary clean-up zone; contacting the aqueous-washed raw synthesis gas in the secondary clean-up zone with a physical solvent for sulphurous materials effective at least partially to absorb sulphurous materials from the aqueous-washed raw synthesis gas and recovering from the secondary clean-up zone an at least partially desulphurised, de-tarred aqueous-washed raw synthesis gas comprising $H_2$, CO, $CO_2$ and, optionally, remaining contaminants.

The clean-up zone c. may optionally further comprise supplying the at least partially desulphurised, de-tarred aqueous-washed raw synthesis gas to a tertiary clean-up zone; contacting the at least partially desulphurised, de-tarred aqueous-washed raw synthesis gas in the tertiary clean-up zone with a physical solvent for $CO_2$ effective at least partially to absorb $CO_2$ from the at least partially desulphurised, de-tarred aqueous-washed raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminant; removing at least part of the absorbed $CO_2$ from the first stream in a solvent regeneration stage to recover regenerated solvent and separately $CO_2$ in a form sufficiently pure for sequestration or other use.

The supply of the clean synthesis gas to a first further reaction train in step e. may optionally take place after passage of the clean synthesis gas through one or more guard beds and/or alternative clean-up zones at least partially to remove any remaining contaminants.

Process stage g. may optionally comprise one or more of process stages i to iv.

Process stage i relates to the use of feedstock which is to be gasified to produce syngas for further processing. Alternately, the feedstock may also be combusted and the energy used to generate steam which can either be supplied to the plant or for power generation (to minimize import of "dirty" power from the grid).

In process stage ii, the syngas produced from gasification can be either used for FT synthesis (upon clean up) to produce saleable product or used as fuel gas (upon sulphur removal) in other unit operations (e.g. gasification) or to produce steam in order to minimize the import of natural gas and/or power to improve the carbon intensity score of the facility.

In process stage iii, the tailgas from the FT synthesis unit can be recycled internally to the first further reaction train (for example an FT unit) or externally to either the partial oxidation zone when present (for example in the case of the first further reaction train being an FT train to convert back the methane generated from the FT to syngas) or the hydrogen to carbon monoxide shifting zone, e.g. water gas shift reactor when present, to maximize the utilization of carbon recovered from the gasification step (and potentially a smaller reactor size as tailgas $H_2$:CO can be higher than fresh syngas from gasification zone or the partial oxidation zone when present). It can also be used as fuel gas in other unit operations (e.g. gasification) or to produce steam in order to minimize the import of natural gas and/or power to improve the carbon intensity score of the facility. Alternately, the $H_2$:CO ratio of the tailgas stream can also be increased using an SMR (steam methane reforming) unit; where the tailgas can serve as both, the process gas as well as a fuel gas—balancing the energy requirements of this additional unit. Since this stream has already undergone clean-up, it can directly be fed to the first further reaction train, for example an FT unit.

In process stage iv, light gasses from upgrading (e.g. LPG) can also be recovered as a product, or for the reasons pertaining to tailgas discussed above, recycled to the partial oxidation zone when present or used as a fuel gas to minimize import of natural gas and/or used to produce steam for use on plant or power generation.

The carbonaceous feedstock may comprise at least one of woody biomass, municipal solid waste and/or commercial and industrial waste for example. The carbonaceous feedstock will have fluctuating compositional characteristics that are dependent on the source and chemistry of the feedstock used.

The carbonaceous feedstock may be in the form of relatively large pieces. The carbonaceous feedstock may be processed to remove oversized items, recyclates, highly halogenous plastics such as PVC, metals and inert items. These items cannot be converted into synthesis gas and/or are likely to a significant contaminant load (for example, the case of highly halogenous plastics); therefore it is preferable to remove said items prior to gasification. These items may be recycled.

The process according to the present invention may ensure that there is a no landfill or waste contaminating the environment, at least in preferred embodiments. Additionally, there are no land use changes caused by fuel requirements when using the process in accordance with the present invention because the process of the invention has the capacity to handle a wide variety of feedstocks.

Non-recyclable waste is conventionally sent to landfill or incineration and woody biomass is conventionally left on a forest floor and/or may contribute to forest fires. The process according to the present invention advantageously provides a lower emissions route to process waste than incineration or landfill. Instead of being burnt, the carbon waste may be converted into a useful product such as sustainable fuel for use in aircraft or vehicles.

The feedstock may be reduced to a size suitable for gasification. For example, the carbonaceous feedstock may be comminuted, shredded or chipped prior to gasification.

The feedstock may optionally be dried by a feedstock dryer prior to feeding the carbonaceous feedstock into a biomass or waste boiler. The biomass or waste boiler may produce high-pressure steam or power. As a non-limiting example, the dryer may be a rotary tube dryer or a belt dryer.

Conventional processes typically use dryers to dry biomass or waste feedstock. Conventionally, dryers are huge consumers of natural gas and/or other forms of power, which is undesirable from a carbon intensity perspective. It is therefore desirable to reduce the amount of natural gas and/or power used to reduce the carbon intensity of the process.

Other suitable drying options to dry carbonaceous feedstock may include using supplementary solar power, natural gas, electric dryers and/or microwave dryers. In certain cases, biomass and/or waste feedstock may be fired to directly or indirectly generate the heat necessary in the drier.

Consequently, the process of the invention may optionally comprise the step prior to gasification of drying the feedstock to a moisture content of less than about 10% w/w. This step may be effected in a biomass or waste dryer supplied with low pressure steam available on plant to dry the feedstock prior to gasification.

Not all carbonaceous feedstocks derived from waste or biomass may need to be dried prior to gasification. When dry waste is used as the carbonaceous feedstock source, the feedstock may not need drying prior to entering the gasification zone. If the moisture content of the feedstock is already less than 10% w/w then it may not be necessary to dry such a feedstock. Dry waste may be fed directly into the gasifier following appropriate selection and comminution as discussed above.

However, in an operational WTL or BTL plant it is likely that the incoming feedstocks will be of variable composition, including with regard to moisture. In the event that the feedstock comprises more than 10% w/w moisture then drying the feedstock to a moisture content below 10% w/w is desirable. Excess moisture supplied with the feedstock into the gasifier causes the gasifier to require more power in the form of oxygen supplied to it. Such drying may be effected in a number of ways, as described above.

In the process of the invention the gasification stage may be effected at low pressure or at high pressure. By "low pressure" it is meant below about 5 bar. By "high pressure" it is meant above about 5 bar, for example above about 10 bar. In the event that high pressure gasification is used, a beneficial consequence for carbon intensity is that no compression of synthesis gas is required on entry to the primary clean-up zone. Gasification zones with all operating pressures are suitable for use in the process of the present invention.

The process of the invention may optionally include a hydrogen to carbon monoxide ratio shifting zone, for example a gas shift reaction or adjustment stage, for the purpose of adjusting the hydrogen to carbon monoxide ratio of the synthesis gas eventually supplied to the first further reaction train. The hydrogen to carbon monoxide ratio shifting zone may include a gas shift reaction or adjustment stage.

The hydrogen to carbon monoxide ratio shifting zone (gas shift reaction or adjustment stage) may be a water gas shift reaction zone. Alternatively, when hydrogen is readily available in circumstances which do not contribute unacceptably negatively to the carbon intensity of the process (e.g. when "green" or "blue" hydrogen are readily available) then the hydrogen to carbon monoxide ratio shifting zone may be a hydrogen gas shift adjustment zone in which a hydrogen stream (preferably a "green" or "blue" hydrogen stream) is combined with the at least partially desulphurised aqueous-washed partially oxidised raw synthesis gas or the at aqueous-washed partially oxidised raw synthesis gas, as the case may be.

In the above by "green hydrogen" is meant hydrogen obtained from the electrolysis of water using renewable energies such as wind or solar.

In the above by "blue hydrogen" is meant hydrogen produced from (fossil or renewables derived) natural gas, usually via steam reforming, with associated carbon capture storage.

Gasification and partial oxidation may optionally be effected simultaneously in a single vessel.

Also in the process of the invention which involves a single vessel for gasification and partial oxidation, the gas shift reaction or adjustment stage may optionally be effected before rather than after the clean-up zone or part of it (for example, in the case of a water gas shift reaction stage, if a sulphur-tolerant water gas shift catalyst is used in the water gas shift reaction zone).

DETAILED DESCRIPTION

Synthesis Gas

Unless the context dictates otherwise, the terms "raw synthesis gas", "clean synthesis gas" and any other phrase containing the term "synthesis gas" are to be construed to mean a gas primarily comprising hydrogen and carbon monoxide. Other components such as carbon dioxide, nitrogen, argon, water, methane, tars, acid gases, higher molecular weight hydrocarbons, oils, tars, volatile metals, char, phosphorus, halides and ash may also be present. The concentration of contaminants and impurities present will be dependent on the stage of the process and carbonaceous feedstock source.

The use of such terms to describe synthesis gas should not be taken as limiting. The skilled person would understand that each of the terms is construed to mean a gas primarily comprising hydrogen and carbon monoxide.

First Useful Product and First Further Reaction Chain

The first further reaction train may for example be a Fischer-Tropsch reaction train and in that case the process of the invention may comprise subjecting the clean synthesis gas to Fischer-Tropsch reaction conditions to generate one or more liquid hydrocarbons as the useful product.

The first useful product may optionally be produced by subjecting the optionally shifted, clean synthesis gas into liquid hydrocarbons.

The liquid hydrocarbons may optionally be upgraded in a second further reaction train to make a second useful product. At least part of the liquid hydrocarbons may be upgraded by at least one of hydroprocessing, hydrotreating, product fractionation, hydrocracking and/or hydroisomerisation.

The FT liquid upgrading unit may for example produce high quality naphtha and Synthetic Paraffinic Kerosene (SPK). Other upgraded products may include gasoline, diesel and waxes.

At least one useful product may comprise synthetic paraffinic kerosene and/or diesel and/or naphtha. The synthetic paraffinic kerosene and/or diesel and/or naphtha may optionally be further used as a transportation fuel component.

The FT liquid upgrading unit may for example be configured as a recycle hydrocracker.

The second further useful product may optionally be a sustainable liquid transportation fuel or a gasoline blendstock. The transportation fuel or gasoline blendstock may optionally be used for aviation and/or vehicles. The sustainable liquid transportation fuel may optionally comprise high quality SPK. The gasoline blendstock may optionally comprise naphtha.

Alternatively, the first further reaction train may optionally be a methanol synthesis train, an ammonia synthesis train, an alcohol synthesis train or a water gas shift reaction train and the resulting first useful product may be methanol, ammonia, alcohol or hydrogen respectively.

Carbonaceous Feedstock

The carbonaceous feedstock may for example comprise at least one of woody biomass, municipal solid waste and/or commercial and industrial waste. The carbonaceous feedstock will have fluctuating compositional characteristics that are dependent on the source and chemistry of the feedstock used.

The carbonaceous feedstock may be in the form of relatively large pieces. The carbonaceous feedstock may be processed to remove oversized items, recyclates, highly halogenous plastics such as PVC, metals and inert items. These items cannot be converted into synthesis gas or, in the case of PVC, create an undesirably high impurity loading in the feed supplied to the gasification zone; therefore it is preferable to remove said items prior to gasification. These items may be recycled.

The carbonaceous feedstock may be reduced to a size suitable for gasification. For example, the carbonaceous feedstock may be comminuted, shredded or chipped prior to gasification.

In some embodiments, the carbonaceous material feedstock is biomass, for example woody biomass feedstock. Example of suitable woody feedstock may include tree length round wood, pulpwood thinnings, whole tree, limbs, branches, tops and/or waste wood.

A shredder may be used to reduce the carbonaceous material to a suitable size for the gasification zone.

In another embodiment, the carbonaceous feedstock is waste material, for example municipal solid waste and/or commercial and industrial waste.

The carbonaceous feedstock may comprise moisture. Preferably in that case, the carbonaceous feedstock is dried to at least some extent prior to gasification.

The carbonaceous feedstock may optionally be conveyed to a dryer to reduce the moisture content to a suitable level. The moisture content may be reduced to less than about 20%, less than about 15% or less than about 10% by weight. Preferably, the carbonaceous feedstock supplied to the gasification zone has a moisture content of at most 10% by weight.

When waste material (as mentioned above) is used as the carbonaceous feedstock source, the feedstock may not need drying prior to entering the gasification zone. Waste material in this case may be fed directly into the gasifier after suitable pre-treatment to remove undesirable components and comminute the feedstock to a size suitable for feedstock handling.

The carbonaceous feedstock may optionally be continuously fed into a gasification zone.

Gasification Zone

The process of the invention obtains raw synthesis gas through gasifying the carbonaceous feedstock in a gasification zone. Gasification may occur in the presence of steam and oxygen. The gasification zone may comprise a singular train, dual trains or multiple trains. Preferably, the gasification zone comprises more than one train to minimize the impact of interruptions on the plant availability.

Three primary types of commercially available gasifiers are of fixed/moving bed, entrained flow, or fluidized bed type. The gasification zone may be an indirect gasification zone in which feedstock and steam are supplied to a gasification vessel which is indirectly heated. Alternatively, the gasification zone may be a direct gasification zone in which feedstock, steam and an oxygen-containing gas are supplied to the gasification vessel and directly combusted to provide the necessary heat for gasification. Also known in the art and suitable for use in the process of the present invention are hybrid gasifiers, and gasifiers incorporating partial oxidation units. In that case it will be understood that in the process of the invention the gasification zone and the partial oxidation zone may be separate zones of a single vessel.

In one embodiment, the gasification zone comprises primarily an indirectly heated deep fluidized bed operating in the dry ash rejection mode and a secondary gasifier, for maximal conversion of the carbonaceous material. In another embodiment, the gasification zone may comprise only a primary indirectly heated fluidized bed.

The fluidised bed operating temperature may vary depending on the compositional characteristics of the carbonaceous feedstock. The fluidised bed operating temperature may be between about 400 and 1000° C., preferably between about 500 and 900° C., or more preferably between about 600 to 800° C.

Such temperature ranges of the fluidised bed have been found to avoid any constituent ash from softening and forming clinkers with the bed material.

The fluidized bed reactor may optionally be preloaded with a quantity of inert bed media such as silica (sand) or alumina. The inert bed media may be fluidized with superheated steam and oxygen. The superheated steam and oxygen may be introduced through separate pipe nozzles.

During gasification, the fluidized bed may undergo drying (or dehydration), devolatilization (or pyrolysis) and gasification. Some combustion, water gas shift and methanation reactions may also occur.

It is desirable to have a pressure within the gasification zone that minimises the need of compression in downstream processes. It is therefore preferable for the gasification zone to have a pressure of at least about 3.5 bar if not higher, for example about 4 bar or more. Gasification zones operating at even much higher pressures such as 10 bar or more are known in the art. Gasification zones operating at even much lower pressures such as 1.5 bar or less are also known in the art. Gasification zones with all operating pressures are suitable for use in the process of the present invention.

The raw synthesis gas leaving the gasification zone may typically have an exit temperature of at least about 600° C., of at least about 700° C., or of at least about 800° C. Preferably, the raw synthesis gas leaving the gasification zone has an exit temperature of from about 700° C. to about 750° C.

The major products leaving the gasification zone are typically steam and raw synthesis gas comprised of hydrogen and carbon monoxide (CO) (the essential components of synthesis gas), carbon dioxide ($CO_2$), methane, and small amounts of nitrogen and argon. There may be additional tars such as benzene, toluene, ethyl benzene and xylene, higher hydrocarbons, waxes, oils, ash, soot, bed media components and other impurities present.

In order to obtain high-quality gas that is required for its use as a feedstock in downstream processes such as synthesis, the impurities need to be removed. Non-limiting examples of suitable synthesis include Fischer-Tropsch (FT) synthesis, ammonia synthesis, methanol synthesis, or as a hydrogen product.

Cyclones may be used to remove undesirable solid materials from the raw synthesis gas.

A tramp discharge system may be used to remove heavier contaminants from the bed material in operation of the gasification process.

Sulphur, slag and other by-products and impurities of gasification may be amenable to capture, collection and reuse. It is difficult however to capture, collect or reuse carbon dioxide unless it is reasonably pure—i.e. at least about 90% pure, at least about 95% pure, or at least about 99% pure. The inventive process allows for the production of high purity carbon dioxide in an otherwise practical WTL or BTL process.

Depending on the source of carbonaceous feedstock and the gasification technology, the raw synthesis gas may typically comprise between about 3 and 40% carbon dioxide, in addition to other impurities and contaminants.

The raw synthesis gas leaving the gasification zone may typically comprise a varying sulphur concentration depending on the source of the feedstock being gasified, typically in the hundreds of ppm.

The concentration of sulphur in the raw synthesis gas will influence the process conditions that are employed downstream.

Partial Oxidation Zone

At least part of the raw synthesis gas from the gasification zone is recovered and at least part of the recovered raw synthesis gas may optionally be supplied to a partial oxidation zone (POx zone). The raw synthesis gas in the partial oxidation zone will undergo partial oxidation reactions.

Conventional partial oxidation zones known in the art are typically catalytic or non-catalytic (thermal).

The partial oxidation zone may optionally partially combust tailgas from a downstream synthesis unit and/or syngas generated in the process and/or light gases from upgrading and/or natural gas with preheated oxygen. The partial oxidation zone may optionally comprise a burner to produce a stream of hot oxygen.

The partial oxidation zone is effective sufficiently to raise the temperature of the raw synthesis gas to convert at least some of any tars, naphthalene, higher hydrocarbons and methane present into carbon oxides, hydrogen and water.

The partial oxidation zone may operate at a temperature of least about 1100° C., at least about 1200° C. or at least about 1300° C. for example. Preferably, the partial oxidation zone operating temperature is at least about 1300° C., most preferably in the range of from about 1200° C. to about 1350° C.

The partial oxidation zone may convert residual methane, naphthalene, higher hydrocarbons and tar components into carbon oxides, hydrogen and water. Synthesis gas leaving the partial oxidation zone may be construed to be equilibrated synthesis gas.

The inventors have found that the removal/destruction of tar components, residual methane and high hydrocarbons increases the carbon utilization of the plant/facility. By converting these impurities and contaminants into synthesis gas and co-processing recycle streams, an increase in product yield can be obtained. The conversion of these undesirable components advantageously simplifies downstream processes, therefore additional purification steps are not required downstream when compared to conventional processes. This contributes to the low carbon intensity of the process according to the invention.

The equilibrated synthesis gas generates high-pressure steam when exiting the POx zone. The high-pressure steam has a high energy efficiency and may be recovered and recycled for use in upstream and/or downstream process which allows energy to be recovered.

Recovery of heat from POx zone may typically be radiant and convective. A simple quench approach may also be used if the carbon intensity score allows.

The advantage of this radiant and convective heat recovery mode is the ability to have High Pressure (HP) steam (generated in a HRSG unit) available for use in the facility. While water quench is also an acceptable (and lower cost) heat recovery option, it negatively impacts the carbon intensity of the facility owing to the need to generate HP steam for users in the plant such as, water gas shift reaction unit and gasification unit, through use of additional natural gas and/or power.

The solids may optionally be removed as a slag from the POx zone.

The raw synthesis gas from the POx zone may undergo at least one of gas clean up, compression and/or sulphur removal.

The inventors have surprisingly found that there is enough water in the raw synthesis gas stream from the gasification zone to enable the POx zone to moderate the temperature, minimise soot formation, reform methane and promote the downstream water gas shift reaction. Therefore, no additional steam is required to be added directly to the raw synthesis gas, unlike in conventional methods. This reduces the amount of steam supplied for the overall process, thereby reducing carbon intensity.

The synthesis gas may optionally be cleaned by sequentially removing ammoniacal, sulphurous and carbon dioxide impurities. The latter impurities may optionally be considered acid gases.

The overall process according to the invention may optionally include additional stages. Therefore, the synthesis gas cleaned by sequentially removing ammoniacal, sulphurous and carbon dioxide impurities may be, for example, raw synthesis gas and/or equilibrated synthesis gas.

The equilibrated synthesis gas leaving the partial oxidation zone will be hot and may optionally be cooled by generating steam. Generation of superheated or saturated high-pressure steam is preferable to improve process efficiency and reduce carbon intensity. The objective of the invention is to reduce or control the carbon intensity of a BTL or WTL process and there are a number of contributory factors of which the generation of superheated steam and/or saturated high pressure steam following partial oxidation is one of the aspects of the invention.

The cooled equilibrated synthesis gas may be passed through for example a venturi scrubber to remove any water and particulates such as ash and soot. A caustic wash may for example be additionally used to remove any other impurities such as ammonia, halides, nitrous oxides and remaining particulates.

The partial oxidation zone may optionally operate at a pressure slightly or somewhat lower than that of the gasification zone (to avoid any intermediate compression requirements). The partial oxidation zone may operate at a pressure of between about 2 and 3 bar for a gasification process that operates around 3.5 bar, for example.

The inclusion of a partial oxidation zone within the process according to certain preferred embodiments of the invention offers flexibility and gives the gasification zone the ability to the handle of a wide range of feedstock with fluctuating compositional characteristics. The inventors have unexpectedly found that the use of a partial oxidation zone is able to remove hydrocarbonaceous materials such as methane, benzene, toluene, ethyl benzene, xylene, higher hydrocarbons and other tars to an extent sufficient to allow the straightforward recovery downstream in the tertiary clean-up zone of carbon dioxide in a form sufficiently pure for sequestration or other use, thereby reducing the carbon intensity of the process compared with convention WTL and BTL processes.

Hydrogen to Carbon Monoxide Ratio Shifting Zone (Gas Shift Reaction or Hydrogen Adjustment)

At least a part of the clean synthesis gas may optionally be passed through a Water Gas Shift (WGS) unit to obtain shifted synthesis gas and optionally blended with the remaining equilibrated synthesis gas to adjust the hydrogen to carbon monoxide ratio to the desired range.

The term "water gas shift reaction" or "WGS" is to be construed as a thermochemical process comprising converting carbon monoxide and water into hydrogen and carbon dioxide. The synthesis gas obtained after the WGS reaction may be construed to be shifted (i.e. adjusted) synthesis gas.

The presence of sulphur compounds is important when considering the choice of WGS catalyst for the WGS reaction. Sulphur may be removed from the feed prior to WGS process or a sulphur tolerant WGS catalyst can be used (sour shift catalyst). Preferably, sulphur is removed from the feed prior to the WGS process.

In one embodiment, the synthesis gas entering the WGS unit is essentially a low sulphur gas (<0.1 ppmv) to enable a sweet shift. The synthesis gas entering the WGS unit may for example be equilibrated synthesis gas.

The process according to the present invention may optionally further comprise sequentially removing ammoniacal, sulphurous and carbon dioxide impurities from the raw synthesis gas and recovering carbon dioxide in substantially pure form.

Sulphur compounds poison sweet shift catalysts. It is important to ensure that there is very little sulphur (per the catalyst provider issued operating guidelines) present in the synthesis gas entering the water gas shift reaction, if a sweet shift catalyst is to be deployed in the process. In such process configuration, sulphur removal should be carried out upstream of the water gas shift reaction.

At least part of the desulphurised synthesis gas may optionally undergo a water gas shift reaction. The water gas shift reaction may produce shifted synthesis gas which when recombined with non-shifted gas from the partial oxidation zone or the gasification zone produces a shifted synthesis gas with a hydrogen to carbon monoxide ratio of 2.00±10 (preferably 5, 2, 1, 0.5, 0.1, 0.05)%. (The shifted portion may itself have a much higher hydrogen to carbon monoxide ratio—even as high as 20:1 for example—but is then recombined with non-shifted gas in appropriate proportions to achieve a recombined synthesis gas with the stated desired hydrogen to carbon monoxide ratios).

The process of sequentially removing ammoniacal, sulphurous and carbon dioxide impurities from the raw synthesis gas and recovering carbon dioxide in substantially pure form may optionally occur prior to the WGS reaction. The resulting synthesis gas may be construed to be desulphurised synthesis gas.

The removal of ammoniacal, sulphurous and carbon dioxide impurities may, for example, be a low-steam physical absorption process.

In accordance with preferred embodiments of the present invention, sulphur has been removed in upstream processes. The equilibrated gas supplied to the water gas shift unit is essentially a low sulphur containing gas.

The water gas shift reaction may optionally use a sweet shift catalyst. The sweet shift catalyst may be a metal sulphide catalyst for example.

As an alternative or in addition to water gas shift the at least partially desulphurised aqueous-washed partially oxidised raw synthesis gas or the at aqueous-washed partially oxidised raw synthesis gas may be adjusted by simple combination with a hydrogen stream, preferably at least partially sourced from "green" or "blue" hydrogen.

Gas Clean Up

The clean-up process may, for example, be a low-steam physical absorption process such as a Rectisol™ or Selexol™ process or any similar solvent based physical absorption process. Alternatively, the clean-up process may, for example, be a chemical process such as an amine wash.

In one embodiment, the physical absorption unit may be configured to operate a dual stage process with two separate absorber columns that contact the synthesis gas stream with methanol comprising a common methanol regeneration system. The first absorber column may selectively remove sulphur and may use a $CO_2$ saturated solvent to minimise $CO_2$ absorption in the sulphur removal column. The second absorber column may recover $CO_2$.

This technology is further described elsewhere; for example in Fossil Fuel Emissions Control Technologies, Bruce Miller, 2015.

Carbon dioxide may preferably be recovered in substantially pure form. The recovery of carbon dioxide may follow the WGS reaction for example.

The WGS reaction produces hydrogen and carbon dioxide from carbon monoxide and (high pressure superheated) steam.

The use of a WGS reaction in the process according to the invention enables adjustment (or shifting) of the hydrogen to carbon monoxide ratio of the synthesis gas entering the WGS unit to a desired ratio.

The removal of ammoniacal, sulphurous and carbon dioxide impurities may, for example, be a low-steam physical absorption process.

Physical absorption processes are typically carried out at low temperatures and high pressures. The inventors have found that the use of a physical absorption process, in particular a low-steam physical absorption process, contributes to the low carbon intensity of the process as is disclosed in our co-pending application U.S. Patent Application No. 63/007,920.

The physical absorption process essentially 'gains' steam from employing the physical absorption process that would otherwise be used if an amine-based gas removal solvent system was employed, as is disclosed in our co-pending application U.S. Patent Application No. 63/007,920. The physical absorption process in accordance with the present invention is therefore to be construed as a "low-steam physical absorption process".

The process according to the invention may optionally further comprise using at least a portion of the steam gained from the low-steam physical absorption process for use in upstream and/or downstream processes.

The upstream process may be drying the carbonaceous feedstock prior to feeding it into a biomass and/or waste boiler and/or used in an oxygen heater for the air separation unit and/or for pre-heating the FT feed. The drying of the carbonaceous feedstock may result in the carbonaceous feedstock having a moisture content of less than about 20%, less than about 15% or less than about 10% by weight.

If further LP steam is available, it may be let down to a low-low pressure (LLP) header and used for the heating of the FT guard bed(s) and/or in the upgrading section and/or in the wastewater stripping section (for example, wastewater reboiler) and/or in the fuel system (for example, natural gas heater) and/or in the deaerator and/or heating and tracing of intermediate or chemical storage tanks.

Alternatively, the clean-up process of the invention may involve a chemical absorption process e.g. an amine-based gas removal solvent system to remove $CO_2$, which process benefits from lower power import and lower capital cost than physical adsorption processes.

The sulphur removal step may be a redox process e.g. a Merichem™ redox process for example and also include a hydrolysis step to hydrolyse hydrogen cyanide and COS. Amine-based gas removal solvent systems are chemical absorption processes.

As mentioned above, the low-steam physical absorption process may be Rectisol™ or Selexol™ process for example. In a non-limiting case, the low-steam physical absorption process is the Rectisol™ process.

The Rectisol™ process uses chilled methanol at low temperatures (ca −40° C.) to remove acid gases, metal carbonyls and trace impurities from the synthesis gas stream via absorption.

Gaseous impurities may include acid gases such as hydrogen sulphide, carbonyl sulphide, hydrogen cyanide, and $CO_2$, all of which are preferentially absorbed in high preference to methane, hydrogen and carbon monoxide. Other trace impurities that may be removed include hydrogen cyanide, $NH_3$ and formic acid. The Rectisol™ process therefore advantageously minimises the loss of the desirable products and removes gaseous impurity components that would be otherwise detrimental to the downstream processes.

The ammoniacal, sulphurous and carbon dioxide impurities removed may include at least one of hydrogen sulphide, carbonyl sulphide, hydrogen cyanide, $NH_3$ and/or $CO_2$. The presence of these impurities can be detrimental to downstream processes and therefore the removal of these impurities is desirable.

The use of a low-steam physical absorption processes may result in synthesis gas with extremely low total sulphur content. The removal of sulphur components eliminates the requirement for additional synthesis gas purification in downstream processes. The low amount of trace contaminants in the synthesis gas may increase the run time on absorbents and provide greater assurance of synthesis gas purity.

The compounds absorbed may be removed from the methanol solvent by flashing (desorption) and additional thermal regeneration. This allows the solvent to be ready for new absorption.

In one embodiment, the plant may comprise two separate Rectisol™ absorber columns that contact the synthesis gas stream with methanol and comprising a common methanol regeneration system. The first absorber column may selectively remove sulphur and uses a $CO_2$ saturated solvent to minimise $CO_2$ absorption in the sulphur removal column. The second absorber column may recover $CO_2$.

This arrangement allows for the selective removal of sulphur from the synthesis gas, followed by the subsequent removal of $CO_2$. At least a portion of the resulting $CO_2$ stream may be reused in the process and/or sequestered.

In variants of the invention which do not utilize a partial oxidation zone it is also desired to remove tars either by condensation prior to the sulphur removal bed or by using the physical absorption solvent to absorb tars and recovering them from the solvent regeneration stage.

The resulting synthesis gas may be construed to be desulphurised synthesis gas.

The sulphur rich off-stream gas may optionally be combusted with an excess of air in an incinerator to convert all sulphur containing compounds to $SO_2$. The incinerator may optionally operate at a temperature of about 1500° C. The $SO_2$ may for example be scrubbed into sulphate.

The resulting gas may be used to raise stream and may therefore be cooled. The cooled synthesis gas may be washed with sodium hydroxide solution to remove the $SO_2$ as sodium sulphite and sodium sulphate.

As is disclosed in our co-pending application U.S. Patent Application No. 62/990,702 the synthesis gas hydrogen to carbon monoxide ratio may optionally be equilibrated in the partial oxidation zone prior to entering the WGS unit; in this case the fluctuation of the hydrogen to carbon monoxide ratio in the synthesis gas has already been substantially reduced. The resulting shifted synthesis gas may optionally be blended with the remainder of the equilibrated synthesis gas (forming the optionally adjusted fine synthesis gas) therefore obtains a desired hydrogen to carbon monoxide ratio specific to the intended synthesis, with an even reduced fluctuation.

At least a portion of the equilibrated synthesis gas and/or raw synthesis gas may optionally be bypassed without subjecting said synthesis gas to a WGS reaction or alternative hydrogen adjustment in the hydrogen to carbon monoxide ratio shifting zone, thereafter, combining said shifted and bypassed gas into optimal proportions to obtain the desired hydrogen to carbon monoxide feed ratio in the optionally adjusted fine synthesis gas. The proportion of gas bypassed will vary depending on the desired ratio of the synthesis reaction downstream and the severity of the shift reaction. Controlling the proportion of bypassed gas sent to the reactors helps in obtaining specific hydrogen to carbon monoxide feed ratios.

As a non-limiting example, it is generally desirable to increase the hydrogen to carbon monoxide ratio of the equilibrated synthesis gas when wanting to supply shifted synthesis gas to a Fisher-Tropsch reactor.

HRU

Hydrogen may optionally be recovered from several stages of the process according to the invention. The inventors found recovering hydrogen from downstream the acid gas removal process, particularly from the shifted gas stream proved to be the most effective. The inventors found that the loss of CO from the overall process was less when compared to hydrogen recovery at other locations. Therefore, the overall economics of the facility are improved due to an increase in product yield, which hydrogen recovery is employed after removal of the ammoniacal, sulphurous and carbon dioxide impurities.

Hydrogen may optionally be recovered from the shifted synthesis gas downstream of the water gas shift reaction.

At least a portion of the shifted synthesis gas may optionally be sent to a Hydrogen Recovery Unit (HRU). The HRU may utilize a Pressure Swing Adsorption (PSA) process to produce high purity hydrogen for different uses. The high purity hydrogen may optionally be used in upstream and/or downstream processes. The offgas from HRU may optionally be used as a fuel gas to reach required combustion temperatures in the incinerators and other uses as outlined in step iv above, reducing the carbon intensity of the inventive process.

The high purity hydrogen from the HRU may be about at least 97%, at least about 98%, and least about 99% pure, at pressure. Impurities that are removed may optionally include, but are not limited to, CO, $CO_2$, $CH_4$, $N_2$ and Ar.

The upstream and/or downstream processes utilizing the recovered hydrogen may optionally include removal of at least one of the ammoniacal, or sulphurous or carbon dioxide impurities, catalyst regeneration of synthesis reactors and product upgrading.

The shifted synthesis gas from the WGS unit combined with bypassed synthesis gas may optionally pass through an inlet filtration system, for example an inlet guard bed, prior to the synthesis unit. The inlet guard bed may optionally be a sulphur guard bed. The inlet guard bed may for example operate in a lead-lag configuration to remove residual traces of contaminants such as hydrogen sulphide, phosphorus, COS, arsenic, chlorides and mercury from the synthesis gas. The lead bed may optionally remove any contaminants present and the lag may serve as a safeguard for when the lead bed breaks through.

The synthesis gas leaving the guard bed may be construed as optionally adjusted fine synthesis gas.

Product

Synthesis gas may be converted into a useful product, for example long chain hydrocarbons. The synthesis gas may be, but is not limited to, shifted synthesis gas, desulphurised synthesis gas, optionally adjusted fine synthesis gas and/or fresh synthesis gas.

The useful product may for example comprise liquid hydrocarbons. The liquid hydrocarbons may for example be sustainable liquid transportation fuels.

The useful product may optionally be produced by subjecting at least part of the synthesis gas to a Fischer-Tropsch synthesis unit.

At least a portion of the synthesis gas may be fed into a synthesis unit. Non-limiting examples of suitable synthesis include Fischer-Tropsch, ammonia synthesis, methanol synthesis, alcohol synthesis or as a hydrogen product.

Synthesis reactions require specific hydrogen to carbon monoxide ratio in feed gas ("desired ratio") for optimum performance to meet process requirements, maximise conversion and product yield. As a non-limiting example, the Fischer-Tropsch synthesis feed may have a hydrogen to carbon monoxide ratio of about 2. This desired ratio is typically lower than the usage ratio. As a non-limiting example, the Fischer-Tropsch synthesis usage ratio may be in the 2.04-2.14 range, typically about 2.1.

According to the embodiment relating to Fischer-Tropsch synthesis, the optionally adjusted fine synthesis gas may optionally be fed into a FT reactor.

The synthesis unit may optionally be a FT unit comprising FT reactors.

The FT reactors may optionally comprise microchannels.

Filters may optionally be used to remove any particulates.

The FT reactor may optionally convert at least part of the carbon monoxide and hydrogen of the optionally adjusted fine synthesis gas into mainly linear hydrocarbons.

The Fischer-Tropsch synthesis unit may optionally convert the optionally adjusted fine synthesis gas into liquid hydrocarbons.

The conversion of synthesis gas into liquid hydrocarbons may optionally be in the presence of a catalyst. The chain length distribution will be dependent on the properties of the catalyst used and the operating conditions.

Fischer-Tropsch reactions are exothermic and release heat that must be removed to keep the temperature of the reaction approximately constant. Localised high temperatures in the catalyst bed have been found to adversely affect the FT product mix, yield and potentially reduce catalyst life. Therefore, it is desirable to keep the temperature constant.

The temperature may be controlled by varying pressure of a steam drum associated with the FT reactor used in conjunction with circulating cooling water for example.

The operating temperature for the FT synthesis may optionally be between about 125 and 350° C., preferably between about 150 and 300° C., more preferably between about 170 and 250° C., e.g. between about 180 and 240° C. Preferably, the operating temperature is between about 180 and 240° C. for a low temperature FT technology.

The catalyst may for example be a metal or compounded metal catalyst with a support. In one embodiment, the metal is cobalt. The support may be made from silica and/or titania for example.

The products that may be obtained in the FT synthesis, for example, may include heavy FT liquid (HFTL), light FT liquid (LFTL), FT process water, naphtha, and tail gas comprising of inerts as well as uncondensed light hydrocarbons, typically $C_1$ to $C_4$. A part of the tail gas comprising of light hydrocarbons, $C_1$ to $C_4$ range, may be recycled back to the POx zone, sent to a fuel gas system or put to other uses as outlined in step iii above.

A part of the tail gas stream may be combined with the fresh synthesis gas prior to being fed to the FT reactors to maximize the utilization of CO available in the synthesis gas. In such instances, a purge stream may be used to prevent build-up of inert gases, such as $CO_2$ and $CH_4$, that are produced in the FT reactors. The use of tail gas stream as a fuel described above would qualify as a purge stream as the gases leave the process loop.

The liquid hydrocarbons may be upgraded to make a useful product. At least part of the liquid hydrocarbons may be upgraded by at least one of hydroprocessing, hydrotreating, product fractionation, hydrocracking and/or hydroisomerisation for example.

The FT liquid upgrading unit may for example produce high quality naphtha and Synthetic Paraffinic Kerosene (SPK). Other upgraded products may for example include gasoline, diesel and waxes. The unit may for example be configured as a recycle hydrocracker.

The useful product may for example be sustainable liquid transportation fuel or a gasoline blendstock. The transportation fuel or gasoline blendstock may for example be used for aviation and/or vehicles. The sustainable liquid transportation fuel may for example comprise high quality diesel and/or SPK. The gasoline blendstock may for example comprise naphtha.

The products formed by a process according to the present invention may for example constitute cleaner versions of fuels formed by conventional processes.

The fuel produced according to the present invention may for example improve air quality, with up to 90% reduction in particulate matter (soot) from aircraft engine exhausts and almost 100% reduction in sulphur oxides.

The process according to preferred embodiments of the present invention may produce transport (aviation and road) fuels with fewer greenhouse gas emissions compared to conventional fuel production processes. Comparative to such conventional processes, the process of the invention may reduce greenhouse gas emissions by at least about 50%, at least about 60%, or at least about 65%. The process of the invention may exhibit a carbon intensity score indicative of at least about 50%, at least about 60%, or at least about 65% savings in greenhouse gas emissions comparative to conventional fuel production processes.

As discussed above, the US currently requires that for an advanced biofuel produced in a WTL or BTL process to qualify for RINs (renewable identification number), a 60% or greater reduction in greenhouse gas emissions (measured as gCO2-eq/MJ of fuel) must be achieved compared to the baseline for a fuel derived from a refinery. In the UK, the Renewable Transport Fuel Obligation Guidance (Article 17(2)) mandates similarly comparative GHG emissions savings of at least 60%.

Depending on the feedstock, fuels made using the process according to the invention, enable significant greenhouse gas reductions. The process according to the present invention may enable the production of aviation and road fuels with at least about 70% fewer greenhouse gas emissions compared to fuel derived from conventional refinery operations.

A purge gas stream from the FT reactors (FT tailgas) and a small off gas stream from the FT liquids upgrading system may optionally be recycled to the upstream process (for example to the gasification or partial oxidation zone) and/or other uses as discussed in steps iii and iv above to improve the overall carbon recovery.

The process according to preferred embodiments of the present invention aims to utilize any off gas produced during any stage of the process according to the invention for power generation where appropriate to reduce the consumption of natural gas or other external fuel source.

Also provided herein is a plant configured to operate the process according to the present invention. The plant configured to operate the process according to the present invention may exhibit a reduction in greenhouse gas emissions compared with a conventional plant of at least about 50%, at least about 60%, or at least about 65%. The plant configured to operate the process according to the present invention may have a carbon intensity score indicative of at least 50%, of at least 60%, of at least 65% savings in greenhouse gas emissions compared with conventional plant.

For avoidance of doubt, all features relating to the process for manufacture of a useful product from carbonaceous feedstock of fluctuating compositional characteristics, also relate, where appropriate, to the low carbon intensity process and the plant configured to operate the process and vice versa.

BRIEF DESCRIPTION OF THE DRAWINGS

FIG. 1 depicts a schematic diagram of a process for undertaking FT synthesis from a biomass and/or waste feedstock in accordance with a preferred embodiment of the invention.

Referring to FIG. 1, a carbonaceous feedstock is supplied in line 1 to variable conveyer 2 and in line 3 to feed dryer 4 and on in line 5 to gasification zone 6. Raw synthesis gas from gasification zone 6 is passed in line 7 to partial oxidation zone 8. Partially oxidised raw synthesis gas passes on in line 9 to water gas shift and gas clean-up zone 10 and on in line 11 to switchable valve 12 and on in line 13 to FT train 14, before passing on in line 15 to upgrading zone 16, generating a second useful product stream in line 17 and a light gas fraction on line 18.

Means are provided, for example in the form of variable conveyer 2, for diverting on demand a portion of the feed stream in line 1 to a combustor steam generator 19, the steam from which may be used in line 20 to generate power for the plant (or elsewhere) in power generator 21. Alternatively (not shown) the steam may be used on plant.

Means are provided, for example in the form of switchable valve 12, for diverting on demand a portion of the clean synthesis gas in line 11 to steam generator 19 in line 22, or as fuel gas to the gasification zone 6 in line 23.

Means are provided, for example in the form of switchable valve 24, for diverting on demand a portion of the tailgas in line 25 to FT reactor train as internal recycle (not shown), to steam generator 19 in line 26, which may further be used in power generator 21, to partial oxidation zone 8 in lines 27 and 28, to the gasification zone 6 as fuel gas in line 29, to water gas shift and gas clean up zone 10 in lines 27 and 30, or to steam methane reforming zone 31 in line 32 for generating a reformed tailgas for recycling in line 33 to line 11, or to the fuel gas header (not shown).

Means are provided, for example in the form of switchable valve (not shown), for diverting on demand a portion of the light gas fraction 18 to tertiary product recovery, to the partial oxidation zone 8, when present, to the gasification zone 6 for use as fuel gas, to the fuel gas header (not shown), or to the steam generator 19 to produce steam for use on plant and/or to generate power for the plant in power generator 21.

The invention will now be more specifically described with reference to the following non-limiting examples.

EXAMPLES

A municipal solid waste or woody biomass feedstock was selected.

Process

The selected feedstock is treated as follows:

The feedstock is initially processed by comminuting it to the required size and drying to a desired moisture content (in this case 10% w/w) to obtain dried MSW or biomass feedstock.

The dried MSW or biomass feedstock is supplied continuously to a fluidised bed gasification unit operated at a temperature of <800° C., a pressure of 2.2 barg and supplied with superheated steam to effect the gasification and produce approximately 5-10 lbmol/hr of raw synthesis gas per short ton of feed per day (STPD).

The raw synthesis gas exits the gasifier and is supplied to an oxygen-fired partial oxidation reactor maintained at a temperature of approximately 1,250° C. and supplied with all of the raw synthesis gas generated from the gasification step described above while adjusting the oxygen rate to achieve a target temperature. The partial oxidation reaction converts residual methane and other hydrocarbons into synthesis gas.

The resulting hot equilibrated synthesis gas is cooled (by generating superheated and saturated high-pressure steam) to a temperature below 200° C. and is then routed through a primary gas cleanup unit where it passes through a venturi scrubber to knock-out water and particulates (such as soot and ash), after which it is caustic-washed to remove ammonia, halides (eg HCl), nitrous oxides and any remaining particulates.

The synthesis gas is then compressed and routed through a secondary gas cleanup and compression system in which acid gas ($H_2S$ and $CO_2$) removal is effected by the Rectisol™ process using a methanol solvent which "sweetens" the synthesis gas Approximately 1-2 lbmol/hr/STPD of acid gas is sent to the battery limit for $CO_2$ capture. The acid gas stream comprises small quantities of $H_2$ (<0.5 mol %), CO (<0.5 mol %), $H_2O$ (<5%) and $N_2$ (~10%).

A portion of synthesis gas is extracted and recycled as fuel for the gasifier.

A portion of the synthesis gas stream is passed through a Water Gas Shift (WGS) unit to adjust the hydrogen to carbon monoxide ($H_2$:CO) ratio in the total feed stream as it recombines.

Throughout the secondary gas cleanup process various guard beds are positioned to remove materials such as mercury, arsenic and phosphorus.

The sweetened and shifted synthesis gas is passed through a final Fischer-Tropsch (FT) inlet guard bed before being sent to the FT Synthesis Unit.

Purified synthesis gas is sent to the FT microchannel reactors where, in the presence of a cobalt catalyst supported on a silica/titania support, it is converted into synthetic liquid hydrocarbons.

Purged/excess tailgas is sent to the POx and the fuel gas system.

The FT reaction water is sent to the wastewater treatment unit where it is fractionated into a distillate containing alcohols and a bottoms fraction containing organic acids. The bottom stream is then upgraded biologically for reuse in the facility.

The synthetic FT liquids are hydrocracked, hydroisomerised and then hydrotreated. Subsequently transportation fuel is obtained from the upgrading unit.

Wastewater recovered from different process units is sent to a Wastewater Treatment unit before disposal or possible reuse.

Results

A few representative examples of the different approaches described above are summarized below:

Example 1

Table 1 illustrates a comparison of the facility performance for 2 scenarios (using municipal solid waste as feedstock). Case A illustrates the situation corresponding to a minimization of the natural gas import (in order to reduce the carbon intensity score and also to reduce operating cost). To achieve this, a part of the syngas generated from gasification of the feedstock is used as fuel in the combustion heaters for the gasification unit. In comparison, Case B illustrates a situation where natural gas is imported and all generated syngas is used for fuel production. It is clear from table below, that ~14% production can be gained by importing natural gas instead of the syngas being used as fuel. However, the carbon intensity score is negatively affected.

TABLE 1

|  | Case A Minimize NG import | Case B Maximize fuel production |
| --- | --- | --- |
| MSW dry to gasifier, t/d | ~1000 | 1X |
| Syngas from gasification, (lbmol/h/stpd) | ~7 | 1X |
| O2 usage from gasification + POx (lb/h/stpd) | ~50 | 1X |
| Syngas used as fuel, (lbmol/h/stpd) | ~1.4 | 0 |
| Syngas to FT, (lbmol/h/stpd) | ~4 | ~5 |
| FT $C_5^+$ product, BPD | ~1,270 | ~1.14X |
| Power import, MW | ~25 | 1X |
| Natural gas import, lb/h/stpd | 0.77 | 3.22 |
| % Natural gas imported as fuel for gasification | 84.0% | 96.2% |
| % FT Tailgas recycle as fuel | 39.6% | 51.3% |
| % FT Tailgas recycle to POx | 60.4% | 48.7% |
| Relative CI score, g(CO$_2$-eq)/MJ | (high) | (low) |

Example 2

Table 2 compares the impact of FT tailgas recycle to the POx unit in order to reduce the natural gas import to improve the carbon intensity score of the facility (using municipal solid waste as feedstock). A small reduction in production of the order 1% is observed while NG import is reduced by approximately 30%.

TABLE 2

|  | Case B FT Tailgas recycle to POx | Case C No FT Tailgas recycle to POx |
| --- | --- | --- |
| MSW dry to gasifier, t/d | ~1000 | 1X |
| Syngas from gasification, (lbmol/h/stpd) | ~7 | 1X |
| O2 usage from gasification + POx (lb/h/stpd) | ~50 | 1X |
| Syngas used as fuel, (lbmol/h/stpd) | 0 | 0 |
| Syngas to FT, (lbmol/h/stpd) | ~5 | 1X |
| FT $C_5^+$ product, bpsd | ~1,440 | ~1.02X |

TABLE 2-continued

|  | Case B FT Tailgas recycle to POx | Case C No FT Tailgas recycle to POx |
| --- | --- | --- |
| Power import, MW | ~25 | ~1X |
| Natural gas import, lb/h/stpd | 3.22 | 4.49 |
| % Natural gas imported as fuel for gasification | 96.2% | 39.6% |
| % Natural gas imported POx | 0% | 48.5% |
| % FT Tailgas recycle as fuel | 51.3% | 100% |
| % FT Tailgas recycle to POx | 48.7% | 0% |
| Relative CI score, g(CO$_2$-eq)/MJ | (low) | (high) |

Example 3

Table 3 below compares the impact of FT tailgas recycle to the WGS unit in order to reduce the natural gas and power import to improve the carbon intensity score of the facility (using biomass as feedstock). For the case of no FT tailgas recycle, all tailgas is assumed to be used for production of additional SH/HP steam and superheated MPS in the flue gas boiler. All superheated steam is used for power generation. The absence of tailgas recycle reduces the syngas to FT and therefore the FT $C_5^+$ product production, but it also reduces both the power and natural gas import which has the effect of reducing the carbon intensity score of the facility. The facility design will be based on a trade-off between the carbon intensity score and revenue generation from the sale of transportation fuel products.

TABLE 3

|  | Base case | No FT Tailgas recycle | FT Tailgas to WGS |
| --- | --- | --- | --- |
| Biomass dry, stpd | ~1,000 | 1X | 1X |
| Syngas from gasification, lbmol/h/stpd | ~8 | 1X | 1X |
| O$_2$ usage from gasification + POx (lb/h/stpd) | ~50 | ~0.9X | ~0.9X |
| Syngas compression power/duty, MW | ~9 | ~0.89X | ~0.91X |
| Syngas to FT, lbmol/h/stpd | ~5 | ~0.88X | ~0.98X |
| FT $C_5^+$ product, BPD | ~1600 | ~0.90X | ~0.95X |
| LP steam excess, lb/h/stpd | ~48 | ~1X | ~0.88X |
| Power import, MW | ~22 | ~0.97X | ~0.95X |
| Natural gas import, MMSCFD | ~6 | ~0.74X | ~0.82X |
| Relative CI score g(CO$_2$-eq)/MJ | (high) | (low) | (mid) |

The invention claimed is:

1. A process for the manufacture of one or more useful products comprising:
   a. gasifying a carbonaceous feedstock comprising waste materials and/or biomass in a gasification zone to generate a raw synthesis gas;
   b. partially oxidizing the raw synthesis gas in a partial oxidation zone to generate partially oxidized raw synthesis gas;
   c. supplying at least a portion of the partially oxidized raw synthesis gas to a clean-up zone to remove contaminants and provide a clean synthesis gas;
   d. importing clean power and/or dirty power into the process;
   e. supplying the clean synthesis gas to a first further reaction train to generate at least one first useful product and a tailgas; and f. diverting selectively on demand a portion of at least one of the carbonaceous feedstock, the clean synthesis gas, the tailgas and (if present) a light gas fraction to heat or power generation within the process, responsive to step d, to control the carbon intensity of the process;

wherein the removal of contaminants comprises removal of ammoniacal, sulphurous and carbon dioxide impurities;

wherein at least a portion of the tailgas is selectively diverted on demand to the partial oxidation zone and/or the first reaction train as internal recycle.

2. The process according to claim 1 wherein means within the process are provided selectively on demand to divert one or more of:
   i. a portion of the carbonaceous feedstock to a combustor to generate energy for the production of steam for use on plant or for power generation; and/or
   ii. a portion of the clean synthesis gas as fuel gas for use on plant and/or or for the generation of steam for use on plant and/or for power generation; and/or
   iii. at least a portion of the tailgas to:
      the hydrogen to carbon monoxide shifting zone, when present; and/or
      a fuel gas stream for fuelling the gasification zone; and/or
      a steam methane reforming zone to generate a reformed tailgas having a higher hydrogen to carbon monoxide ratio than the tailgas and supplying the reformed tailgas as a feed to the first further reaction train; and/or
      a fuel gas header for use on plant; and/or
      for the generation of steam for use on plant or for power generation; and/or
   iv. at least a portion of alight gas fraction (if present) to:
      a partial oxidation zone, when present; and/or
      a fuel gas stream for fuelling the gasification zone; and/or
      a third useful product stream;
      fuel gas header for use on plant; and/or
      for the generation of steam for use on plant or for power generation.

3. The process according to claim 1 wherein means are provided selectively on demand to divert both a portion of the carbonaceous feedstock to a combustor to generate energy for the production of steam for use on plant or for power generation, and a portion of the clean synthesis gas as fuel gas for use on plant or for the generation of steam for use on plant or for power generation.

4. The process according to claim 1 wherein means are provided selectively on demand also to divert at least a portion of the tailgas to a hydrogen to carbon monoxide shifting zone, when present; and/or a fuel gas stream for fuelling the gasification zone; and/or a steam methane reforming zone for additional syngas production and/or or for the generation of steam for use on plant or for power generation.

5. The process according to claim 1 wherein means are provided selectively on demand also to divert at least a portion of a light gas fraction (if present) to one or more of the partial oxidation zone; and/or a fuel gas stream for fuelling the gasification zone; and/or or for the generation of steam for use on plant or for power generation and/or recovery as a useful product.

6. The process according to claim 1 wherein the carbonaceous feedstock has fluctuating compositional characteristics and comprises at least one of woody biomass, municipal solid waste and/or commercial and industrial waste or a combination of these.

7. The process according to claim 1 wherein the process further comprises using a biomass or waste boiler to produce high-pressure steam and power.

8. The process according to claim 1 wherein the first useful product is produced by subjecting the clean synthesis gas to a Fischer-Tropsch synthesis unit.

9. The process according to claim 8 wherein the Fischer-Tropsch synthesis unit converts the clean synthesis gas into liquid hydrocarbons.

10. The process according to claim 9 wherein the liquid hydrocarbons are upgraded into the second useful product.

11. The process according to claim 10 wherein at least a part of the liquid hydrocarbons are upgraded by at least one of hydroprocessing, product fractionation, hydrocracking and/or isomerisation to produce the second useful product.

12. The process according to claim 1 wherein the at least one useful product comprises synthetic paraffinic kerosene and/or diesel and/or naphtha.

13. The process according to claim 1 having a carbon intensity score indicative of at least 60% savings in greenhouse gas emissions comparative to a conventional process for producing the useful product.

14. The process according to claim 1 wherein step d, comprises shifting the clean synthesis gas in a hydrogen to carbon monoxide ratio shifting zone to generate shifted clean synthesis gas.

15. The process according to claim 1 wherein step e, comprises upgrading the first useful product in a second further reaction train to generate a second useful product and the light gas fraction.

16. A plant configured to operate the process of claim 1 comprising:
   a. means for gasifying a carbonaceous feedstock comprising waste materials and/or biomass in a gasification zone to generate a raw synthesis gas;
   b. means for partially oxidising the raw synthesis gas in a partial oxidation zone to generate partially oxidised raw synthesis gas:
   c. means for supplying at least a portion of the raw synthesis gas to a clean-up zone to remove contaminants and provide a clean synthesis gas;
   d. means for importing clean power and/or dirty power into the process;
   e. means for supplying the clean synthesis gas to a first further reaction train to generate at least one first useful product and a tailgas; and
   f. means for diverting selectively on demand a portion of at least one of the carbonaceous feedstock, the clean synthesis gas, the tailgas and (if present) a light gas fraction to heat or power generation within the process, responsive to step d, to control the carbon intensity of the process.

17. The plant according to claim 16 wherein means d, comprises means for shifting the clean synthesis gas in a hydrogen to carbon monoxide ratio shifting zone to generate shifted clean synthesis gas.

18. The plant according to claim 16 wherein means e, comprises means for upgrading the first useful product in a second further reaction train to generate a second useful product and the light gas fraction.

19. The process according to claim 1, wherein the removal of ammoniacal, sulphurous and carbon dioxide impurities is a low-steam physical absorption process.

20. The process according to claim 1 wherein the carbon dioxide is sequestered.

21. The process according to claim 19 wherein the process further comprises using at least a portion of steam gained from the low-steam physical absorption process for use in upstream and/or downstream processes.

22. The process according to claim 21 wherein the upstream process is a feedstock pre-processing step drying the carbonaceous feedstock prior to feeding it into a biomass and/or waste boiler.

23. The process according to claim 22 wherein drying the carbonaceous feedstock results in the carbonaceous feedstock having a moisture content of less than about 20% by weight.

24. The process according to claim 22 wherein drying the carbonaceous feedstock results in the carbonaceous feedstock having a moisture content of less than about 15% by weight.

25. The process according to claim 22 wherein drying the carbonaceous feedstock results in the carbonaceous feedstock having a moisture content of less than about 10% by weight.

* * * * *